United States Patent [19]
Hirano

[11] 3,764,147
[45] Oct. 9, 1973

[54] CARTRIDGE EJECT ACTUATING CIRCUITRY FOR MULTI-TRACK TAPE CARTRIDGE PLAYER

[75] Inventor: Takeshi Hirano, Iwaki, Japan

[73] Assignee: Alps Motorola, Inc., Tokyo, Japan

[22] Filed: Apr. 12, 1972

[21] Appl. No.: 243,362

[52] U.S. Cl. .................................. 274/4 B, 242/198
[51] Int. Cl. .............................................. G11b 5/00
[58] Field of Search ................... 274/4 B, 4 C, 11 B, 274/11 C; 242/197–200, 55, 19; 352/74; 179/100.2 Z

[56] References Cited

UNITED STATES PATENTS

| | | | |
|---|---|---|---|
| 3,485,500 | 12/1969 | Loeshner et al. | 274/11 B |
| 3,575,421 | 4/1971 | Kato | 274/4 B |
| 3,599,985 | 8/1971 | Huber | 274/4 B |

*Primary Examiner*—Leonard D. Christian
*Attorney*—Foorman L. Mueller et al.

[57] ABSTRACT

Cartridge eject actuating circuitry for a multi-track tape cartridge player includes a rotary switch having a plurality of contacts equal in number to the number of tracks on a tape in a cartridge inserted into the player. The wiper of the rotary switch is coupled to the tape head indexing cam of the player and moves to corresponding contacts of the switch in accordance with the rotation of the cam. The indexing cam is rotated by an indexing solenoid enerized by the movement of a conductive strip on the tape into alignment with a sensor. A cartridge eject solenoid is coupled to the rotary switch contacts and to the power source of the tape player through a capacitor. Movement of the rotary switch wiper to a predetermined contact causes the capacitor to be charged to energize the solenoid during the charging time of the capacitor for ejection of the cartridge from the player. During movement of the wiper between contacts, the capacitor is discharged, but the cartridge eject solenoid is maintained deenergized to permit movement of the conductive strip on the tape to move past the sensor thereby avoiding subsequent ejection of the cartridge and/or indexing of the tape head upon reinsertion of the cartridge into the player.

8 Claims, 4 Drawing Figures

CARTRIDGE EJECT ACTUATING CIRCUITRY FOR MULTI-TRACK TAPE CARTRIDGE PLAYER

BACKGROUND

This invention relates to electrical circuitry for automatic actuation of the cartridge eject mechanism in a cartridge tape player.

Automatic cartridge eject devices for expelling a cartridge having a tape with a metal foil strip thereon from a tape player, are known in the art. When the metallic foil is contacted by a switch in the player, the cartridge eject mechanism is actuated. Such devices have drawbacks, however that upon reinsertion of the tape cartridge into the player, the channel selector which also operates by sensing the metal foil, is inadvertently operated or the cartridge is again expelled since the foil re-engages the contact switch.

SUMMARY

Accordingly, it is a primary object of the present invention to provide in a cartridge type tape player of the type described, circuitry to eliminate the above described drawback of the prior art devices.

It is another object of the present invention to provide circuitry of the above type which is relatively simple in design and inexpensive to fabricate.

Briefly, a preferred embodiment of the cartridge eject actuating circuitry according to the invention includes a tape head indexing solenoid operable upon the sensing by a contact switch of a section of metal foil on the tape in a cartridge inserted into the player. Operation of the solenoid in turn causes the rotation of the armature of a rotary switch. The armature upon rotation moves between a predetermined pair of contacts of the rotary switch and engages momentarily an intermediate contact. A capacitor, coupled to a relay which when energized serves to actuate a cartridge eject solenoid of the player, is charged while the rotary switch armature remains in contact with one of the contacts, but is discharged momentarily as the rotary switch armature passes over the intermediate contacts. A diode in parallel connection with the solenoid passes the charge on the capacitor to prevent energization of the solenoid during movement of the wiper through the intermediate contacts. Upon the armature reaching the second contact of the pair, the capacitor begins to be charged again and provides a path for the energization of the relay thereby to operate the cartridge eject solenoid during the charging time of the capacitor.

The movement of the tape through the cartridge during the delay caused by the movement of the wiper between contacts, prior to the energization of the relay to operate the eject solenoid, carries the metal foil past the contact switch, thereby eliminating the chance of operation of the tape head indexing solenoid and/or cartridge eject mechanism upon reinsertion of the cartridge into the player.

DETAILED DESCRIPTION

Figure 1:
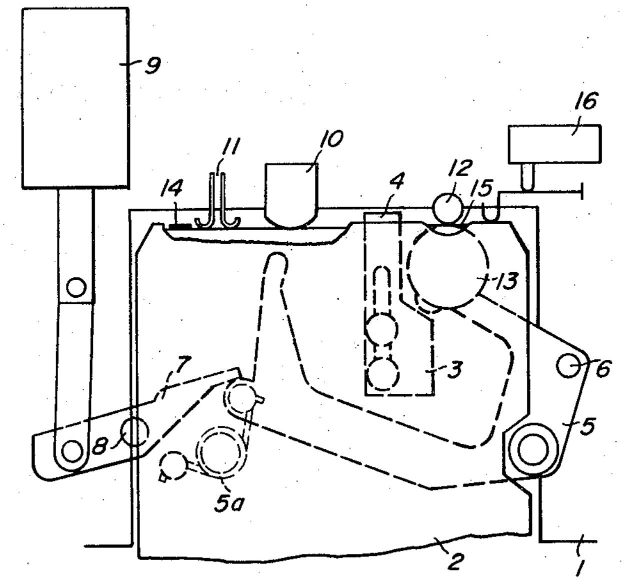
FIG. 1 is a top plan view of a cartridge tape player including a cartridge eject mechanism and actuating circuitry for automatically operating the eject mechanism, according to the invention.

Referring now to the drawing in greater detail wherein like numerals have been used throughout the various views to designate similar parts, in FIG. 1, numeral 1 designates a cartridge tape player main body or chassis. When a cartridge 2 is inserted thereinto, a bent portion 4 of a slide lever 3 is depressed thereby to move the lever 3 in the direction of movement of cartridge 2. The slide lever 3 abuts a C-shaped lever 5 which is rotated in a clockwise direction as seen in the drawing, about a pivot shaft 6 fixed to the main body. Movement as described snaps an overcenter spring from a first to a second stable state to maintain C-lever 5 in the locked position.

Numeral 9 designates a solenoid for initiating the operation of the automatic eject action of cartridge 2. Numeral 7 designates an actuating arm coupled to solenoid 9 and pivotal about point 8 for engaging C-lever 5 to return it to a normal position and to snap overcenter spring back to a first stable state. Numeral 10 designates a magnetic tape head for playing back information recorded on a multi-track tape 15 in cartridge 2 inserted into main body 1. Numeral 11 designates a contact switch, 12 a capstan shaft for driving the tape through the cartridge and 14 a conductive strip of metal foil bonded to tape 15 at the end of the tracks on the tape. An electrical switch 16 is brought into the closed state only when a cartridge is inserted into the main body 1 to provide power to the player.

Figure 2:
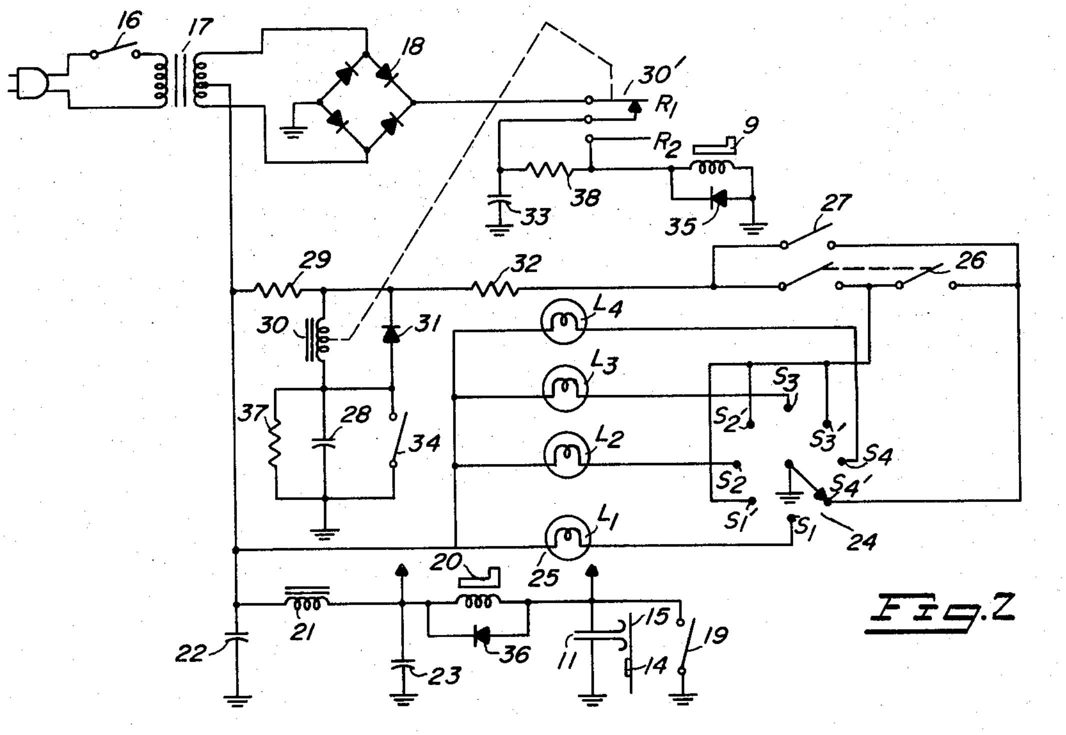
FIG. 2 is a schematic diagram of the cartridge eject actuating circuitry according to the invention.

In FIG. 2, there is shown a schematic diagram of the automatic cartridge eject actuating circuitry included in the tape player.

Upon insertion of cartridge 2 into main body 1 of the tape player, the electric switch 16 is closed and A.C. from a power source (not shown) is passed through the secondary of transformer 17. A full wave rectifier bridge 18 provides D.C. to power the circuit.

Figure 3A:
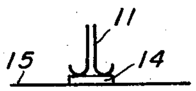
FIGS. 3*a* and 3*b* are graphic illustrations of a contact switch included in the circuitry of FIG. 2.

In the case where the metal foil 14 engages contact switch 11 (see FIG. 3*a*) or when a selector switch 19 is closed manually, current is passed through a channel transferring solenoid 20 causing a tape head indexing cam (not shown) to be rotated, whereby the magnetic tape head is varied in height with respect to the channels or tracks on tape 15. An inductor or choke 21 and capacitors 22, 23 form a filter circuit.

In accordance with the rotation of the tape head indexing cam, a contact piece or wiper 24′ of a rotary switch 24 coupled to the cam, is rotated simultaneously therewith. The contact or wiper 24′ of the rotary switch 24 is rotated at every operation of the tape head indexing or transferring solenoid 20 in a sequence, such as, from contact S1 to S2, S2 to S3, S3 to S4 and S4 to S1, whereby indicator lamps 25 are ignited in the order of L1, L2, L3, L4, respectively. Furthermore the wiper 24′ of the rotary switch 24 passes through a terminal S1′ while the contact 24′ is transferred from S1 to S2. Likewise, the contact 24′ passes through terminals S2′, S3′, S4′ when it is transferred from S2 to S3, S3 to S4 and S4 to S1, respectively.

When the interlinked switch 26 of the automatic cartridge eject mechanism is closed, charging current flows to capacitor 28 through a resistor 29 and relay 30 until a predetermined voltage is established in capacitor 28. When wiper 24′ of rotary switch 24 passes through a terminal S1′ while moving between S1 and S2, the charge established on capacitor 28 is grounded through a diode 31, resistor 32 and contact 24′ of the rotary switch. Thereafter, when the wiper leaves terminal S1′ and moves to contact S2, current flows through resistor 29 so that relay 30 is operated and capacitor 28 is again charged.

A contact 30′ of relay 30 is normally closed to the R1 side to charge capacitor 33. However, when relay 30 is operated, contact 30′ is closed to the R2 side, and the charge on capacitor 33 is dissipated to operate solenoid 9 of the cartridge eject mechanism to eject cartridge 2 from the main body of the player.

Figure 3B:
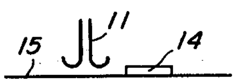

It should be noted that the cartridge 2 is expelled from the player a predetermined time after metal foil 14 on tape 15 is brought into contact with contact switch 11 (see FIG. 3*a*) due to the delay provided by the movement of wiper 24′ between contacts and because capacitor 28 is discharged through diode 31 and as such does not operate relay 30 during discharge. Thus, the metal foil 14 is advanced for a certain distance (see FIG. 3*b*) from the contact switch 11 when the cartridge is actually ejected from main body 1. For this reason, even if the cartridge might be reinserted into main body 1, there is no fear that metal foil 14 would again touch or contact switch 11 to cause the cycle to repeat.

In the case wherein the interlinked switch 26 is closed, the delayed ejection of cartridge 2 occurs when wiper 24′ passes through each of the terminals S1′, S2′, S3′, S4′, respectively. In other words, the cartridge 2 is expelled with the above described delay when magnetic tape head 10 is shifted from the first track or channel to the second track or channel, and also from the second to the third, from the third to the fourth and from the fourth to the first channel.

When switch 27 is closed, while switch 26 is opened, the above described automatic delayed ejection of the cartridge 2 occurs only when wiper 24′passes position S4′ of the rotary switch 24. This means that only when the magnetic tape head is shifted from the fourth channel to the first channel, is the cartridge 2 expelled from the player.

If manual ejection of the cartridge is desired, switch 34 is closed, causing sufficient current to flow to relay 30 for operation thereof. The contacts 30′ thereof are moved to the R2 side whereby solenoid 9 is operated and the cartridge 2 is immediately expelled.

Diodes 35 and 36 are employed for blocking the reversed electromotive force induced in the cartridge releasing solenoid 9 and the channel transferring or tape head indexing solenoid 20. Resistor 38 is employed for protecting contact 30′ of relay 30 and to prevent erroneous operation of the relay 30.

The circuit of the invention provides for the automatic ejection of a cartridge from a tape player either after the playing of a single tape track on a multi-track tape or after all of the tracks are played, with a delay sufficiently long after the sensing of the metal foil at the end of the tape tracks, to prevent ejection again upon reinsertion of the cartridge into the player. The latter is accomplished by moving the metal foil away from the contact switch which activates the tape head indexing solenoid prior to ejection of the cartridge. Accordingly, there is no fear that metal foil 14 will be brought into contact with switch 11 even upon reinsertion of the cartridge 2 into the main body 1 of the tape player, so that unnecessary tape head indexing and cartridge ejection is avoided.

I claim:

1. In a cartridge tape player adapted to receive a tape cartridge having a multi-track recording tape therein mounted for movement through said cartridge, said tape having a conductive strip thereon defining the ends of the tracks thereof, said tape player including tape driving instrumentalities connectable to a power source for operation thereof in response to the insertion of a tape cartidge into said player for driving said tape through said cartridge and being disconnectable from said power source upon removal of said tape cartridge from said player, a magnetic tape head for playing back information recorded on said tape, said tape head being mounted for movement into alignment with the various tracks on said tape, tape head indexing means for moving said tape head incrementally from tape track to tape track, sensing means for detecting the conductive strip at the ends of said tape tracks and in response thereto causing the operation of said tape head indexing means to move said tape head into alignment with a successive one of said tape tracks, and a cartridge eject mechanism for ejecting a cartridge from said player when said tape head is moved into alignment with a predetermined track on said tape, actuating circuitry for said cartridge eject mechanism including switch means having a plurality of separated contacts thereon equal in number to the number of tracks on said tape, a wiper movable in response to the incremental movement of said tape head between said tape tracks to corresponding contacts of said switch means, said cartridge eject mechanism being operated to eject a cartridge from said player upon movement of said wiper to a predetermined one of said contacts corresponding to said predetermined tape track, the operation of said cartridge eject mechanism being delayed during movement of said wiper to said predetermined contact to permit said tape drive instrumentalities to move said conductive strip past said sensor, thereby avoiding subsequent ejection of said cartridge upon reinsertion thereof into said player.

2. A cartridge tape player as claimed in claim 1 wherein the switch means of said activating circuitry includes a rotary switch having a plurality of contacts thereon, and intermediate contact terminals engageable momentarily by said wiper as the latter moves between said first-mentioned contacts, and a capacitor being coupled electrically to said power source and said rotary switch contacts and being charged by said power source during the time said wiper engages said rotary switch contacts and discharged through said wiper when the latter engages said intermediate contact terminals, said cartridge eject mechanism including an operating solenoid coupled electrically to said capacitor, said solenoid being maintained de-energized during discharge of said capacitor to permit said tape drive instrumentalities to move said conductive strip past said sensing means and being energized to operate said cartridge eject mechanism in response to said wiper engaging said predetermined one of said contacts during the charging of said capacitor.

3. A cartrdge tape player as claimed in claim 2 wherein said cartridge eject actuating circuity further includes diode means coupled to said capacitor to provide a path for discharging said capacitor during the movement of said wiper to said predetermined contact while maintaining said cartridge eject solenoid de-energized.

4. A cartridge tape player as claimed in claim 2 wherein said tape player further includes a tape head indexing assembly including a cam member mounted for rotation incrementally in accordance with the sensing of said conductive strip on said tape to position said tape head with respect to the various tracks on said tape, the wiper of said switch means being coupled to said rotary cam member and movable therewith to corresponding contacts of said switch means.

5. A cartridge tape player as claimed in claim 4 further including selector switch means interposed between the contacts of said switch means and said cartridge eject solenoid and operable to first and second conditions, said cartridge eject solenoid being energized upon movement of said switch wiper to each successive contact of said switch means when said selector switch means is operated to said first condition and being energized upon movement of said wiper to a predetermined one of said contacts of said switch means when said selector switch means is operated to said second condition.

6. In a cartridge tape player adapted to receive a tape cartridge having a multi-track recording tape therein mounted for movement therethrough, said tape having a conductive strip thereon defining the ends of the tracks of the tape, said tape player including tape driving instrumentalities connectable to a power source for operation thereof in response to the insertion of a tape cartridge into said player for driving said tape through said cartridge, a magnetic tape head for playing back recorded information on said tape, said tape head being mounted for movement with respect to said tape into alignment with the various tracks on said tape, tape head indexing means including a rotatable cam member and solenoid, said cam member being coupled to said tape head to move the latter with respect to said tape tacks in response to the rotation of said cam member to predetermined positions, sensing means coupled electrically to said tape head indexing solenoid for sensing the conductive strip at the end of said tape tracks and in response thereto causing the energization of said tape head indexing solenoid to rotate said cam member incrementally and a cartridge eject mechanism for ejecting a cartridge from said player when said tape head is moved into alignment with a predetermined track on said tape, including a solenoid energizable to operate said eject mechanism to remove said tape cartridge from said player, actuating circuitry for said cartridge eject mechanism including a rotary switch having a plurality of contacts thereon equal in number to the number of tracks on said tape, a wiper rotatably coupled to said tape head indexing cam for movement therewith between said switch contacts and intermediate contact terminals engageable momentarily by said wiper during movement of the latter between said first mentioned contacts, and a capacitor coupled to said power source and said rotary switch contacts through said cartridge eject solenoid, said wiper being rotated by the movement of said tape head indexing cam in response to the sensing of said conductive strip by said sensor, said capacitor being charged by said power source during the time said rotary switch wiper is in engagement with said switch contacts and being discharged through said wiper upon the latter engaging one of said intermediate contact terminals, said eject solenoid being maintained de-energized while said capacitor is discharging and being energized during the recharging of said capacitor, subsequent to said wiper moving to a successive contact when said tape head is moved into alignment with said predetermined track on said tape, thereby to eject said cartridge from said player and to deactivate said tape driving instrumentalities subsequent to said conductive strip being moved past said sensor.

7. A cartridge tape player as claimed in claim 6 further including switch means interposed between said rotary switch contacts and said capacitor and operable to first and second conditions, said cartridge eject solenoid being energized upon movement of said rotary switch wiper to each successive contact when said switch means is operated to said first condition and being energized upon movement of said rotary switch wiper to a predetermined one of said contacts when said switch means is operated to said second condition.

8. A cartridge tape player as claimed in claim 7 wherein said conductive strip at the end of said tape tracks comprises a section of metal foil, wherein said sensing means comprises a two terminal contact switch coupled electrically to said tape head indexing solenoid and wherein upon moving said tape to poition said metal foil in engagement with the two terminals of said contact switch, said last mentioned solenoid is energized to rotate said tape head indexing cam.

* * * * *